United States Patent
Laroche

(10) Patent No.: US 12,359,582 B2
(45) Date of Patent: Jul. 15, 2025

(54) LABYRINTH SEAL COMPRISING AN ABRADABLE ELEMENT WITH VARIABLE CELL DENSITY

(71) Applicant: Safran Aircraft Engines, Paris (FR)

(72) Inventor: Clément Raphaël Laroche, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/603,109

(22) PCT Filed: Apr. 10, 2020

(86) PCT No.: PCT/EP2020/060312
§ 371 (c)(1),
(2) Date: Oct. 12, 2021

(87) PCT Pub. No.: WO2020/208224
PCT Pub. Date: Oct. 15, 2020

(65) Prior Publication Data
US 2022/0186627 A1 Jun. 16, 2022

(30) Foreign Application Priority Data
Apr. 12, 2019 (FR) .................................. 1903956

(51) Int. Cl.
*F01D 11/02* (2006.01)
*F01D 11/12* (2006.01)
(Continued)

(52) U.S. Cl.
CPC .......... *F01D 11/02* (2013.01); *F01D 11/122* (2013.01); *F01D 11/127* (2013.01);
(Continued)

(58) Field of Classification Search
CPC ........... F05D 2300/522; F05D 2240/55; F05D 2250/283; F01D 11/001; F01D 11/02;
(Continued)

(56) References Cited

U.S. PATENT DOCUMENTS

| | | | | |
|---|---|---|---|---|
| 2009/0041610 A1* | 2/2009 | Meier | .................... | F16J 15/444 419/26 |
| 2016/0032834 A1* | 2/2016 | Plante | ...................... | F02K 3/06 415/119 |

(Continued)

FOREIGN PATENT DOCUMENTS

| | | |
|---|---|---|
| DE | 202021106640 U1 * | 1/2022 |
| EP | 1 262 633 A1 | 12/2002 |

(Continued)

OTHER PUBLICATIONS

French Search Report dated Jan. 14, 2020 from the French Intellectual Property Office in FR Application No. 1903956.

(Continued)

*Primary Examiner* — David E Sosnowski
*Assistant Examiner* — Art Golik
(74) *Attorney, Agent, or Firm* — Sughrue Mion, PLLC

(57) ABSTRACT

The present invention relates to a labyrinth seal for a turbine engine, in particular of an aircraft, comprising a rotor element and a stator element extending around the rotor element, the rotor element being suitable for rotating relative to the stator element about an axis of rotation having an axial direction (DA), the rotor element comprising an annular lip having an outer radial end extending towards an abradable element (57) carried by the stator element, the outer radial end of the annular lip having a corrugation in the axial direction (DA) and a non-zero axial expanse ($E_5$) associated with the corrugation, the abradable element (57) comprising a plurality of cells (50a, 50b) arranged adjacent to one (Continued)

another along the axial direction (DA) and an ortho-radial direction (O), the cells (50a, 50b) comprising walls which extend in an essentially radial direction, the cells being distributed with a first cell density in a first densified annular zone ($Z_{51}$) of the abradable element, said densified annular zone ($Z_{51}$) being located opposite the radial end of the lip, said densified annular zone having an axial expanse less than or equal to the axial expanse of the outer radial end of the lip, the cells being distributed according to a reference density of cells outside said first zone, the first density being greater than the reference density.

15 Claims, 7 Drawing Sheets

(51) Int. Cl.
| | | |
|---|---|---|
| *F16J 15/447* | (2006.01) | |
| *F01D 11/00* | (2006.01) | |
| *F04D 29/08* | (2006.01) | |
| *F16J 15/453* | (2006.01) | |

(52) U.S. Cl.
CPC ......... *F16J 15/4472* (2013.01); *F01D 11/001* (2013.01); *F01D 11/125* (2013.01); *F04D 29/08* (2013.01); *F04D 29/083* (2013.01); *F05D 2230/50* (2013.01); *F05D 2240/55* (2013.01); *F05D 2250/11* (2013.01); *F05D 2250/121* (2013.01); *F05D 2250/283* (2013.01); *F05D 2300/522* (2013.01); *F16J 15/447* (2013.01); *F16J 15/4474* (2013.01); *F16J 15/4476* (2013.01); *F16J 15/4478* (2013.01); *F16J 15/453* (2013.01)

(58) Field of Classification Search
CPC ... F01D 11/122–127; F16J 15/447–453; F04D 29/08; F04D 29/083
See application file for complete search history.

(56) References Cited

U.S. PATENT DOCUMENTS

| | | |
|---|---|---|
| 2017/0058689 A1 | 3/2017 | Gaebler et al. |
| 2018/0010467 A1* | 1/2018 | Zhang ................ F01D 5/225 |
| 2018/0087669 A1* | 3/2018 | Saha .................. F01D 11/08 |
| 2019/0010819 A1* | 1/2019 | Ladewig .............. F01D 11/127 |

FOREIGN PATENT DOCUMENTS

| | | | |
|---|---|---|---|
| EP | 3 425 170 A2 | 1/2019 | |
| EP | 3 425 170 A3 | 1/2019 | |
| WO | WO-2015130377 A2 * | 9/2015 | ............. B22F 10/20 |

OTHER PUBLICATIONS

International Search Report dated Jun. 24, 2020 from the International Searching Authority in International Application No. PCT/EP2020/060312.

Translation of Written Opinion dated Jun. 24, 2020 from the International Searching Authority in International Application No. PCT/EP2020/060312.

* cited by examiner

LABYRINTH SEAL COMPRISING AN ABRADABLE ELEMENT WITH VARIABLE CELL DENSITY

FIELD OF THE INVENTION

The present invention relates to a labyrinth seal for a turbomachine, particularly of an aircraft.

STATE OF THE ART

It is known to equip a turbomachine with labyrinth seals which are dynamic seals whose tightness is provided by one or several rotating wipers. As represented in FIG. 1, the wipers 5 are carried by a rotor element 1 of the turbomachine, which rotates about an axial direction A inside a stator element 3 and are surrounded by abradable elements 7, such as blocks or a coating of abradable material, carried by this stator element 3.

The abradable elements 7 aim at protecting the wipers 5 from the risk of wear by contact with the stator element 3 which surrounds them. The contacts with the abradable elements 7 can be avoided or on the contrary sought, for example, to optimize the radial clearances J around the wipers. The types of abradable elements 7 and wipers 5 can be adapted accordingly.

This technology can be used to provide a sealing at the tops of the blades of a rotor wheel, these blades carrying annular, possibly sectored, wipers which are surrounded by abradable elements carried by a stator casing (see in particular FR-A1-3 001 759).

It can also be used to provide a sealing between a shaft or journal portion and a stator of the turbomachine. The number and dimensions of the wipers are in particular dependent on the radial space available between the elements to be sealed.

The wiper and the abradable element placed facing each other are annular parts of the same axial direction, denoted A in FIG. 1. The wiper extends radially towards the abradable element. In operation, the radial end of the wiper that faces the abradable element has the function of disturbing the gas flow which attempts to flow between the rotor and stator elements from upstream to downstream. This creates turbulence in the gas flow which generates pressure drops and thus improves the tightness of the seal.

As represented in FIG. 2, the abradable element 7 has a cylindrical shape about the axial direction A. The abradable element 7 may comprise a plurality of cells 20 which extend in a substantially radial direction. The cells 20 have walls 22 and are disposed adjacent to each other along the axial direction A and a circumferential direction O. The presence of the cells 20 contributes to creating turbulence in the gas flow.
Particularly the Cells can have a Honeycomb Shape.

FIG. 4 represents an axial cross section of an abradable element 7 and of a wiper 5 located facing each other. In operation, as represented in FIG. 4, the abradable element and the wiper 5 have the function of disturbing the gas flow 43 which attempts to flow between the abradable element 7 and the wiper 5 from upstream to downstream, that is to say from left to right in the drawing. The end 45 of the wiper 5 creates turbulence in the gas flow which generates pressure drops and thus improves the tightness of the seal. At each wiper 5 to be crossed, the gas flow 43 is disturbed upstream of the wiper 5, the gas flow passing inside a cell 20 of the abradable element 47 along the walls 22 of a cell 20, then downstream of the wiper 5 following the sudden increase in the passage section after the crossing of the wiper. An area 44 located at the edge of the cell of the abradable element and facing the end 45 of the wiper corresponds to an area where the air is disturbed and does not allow a normal and total flowing of the air that does not enter the cells 20 until the downstream side of the wiper 5.

FIG. 3a represents a ring-shaped abradable element 7 in the situation where the ring has been axially cut at a particular angle and then opened and laid flat. The abradable element 7 comprises cells 20a disposed adjacent to each other along the direction $D_A$ of the axis of rotation A and circumferential direction O. The wiper 5 represented in a perspective view rotates inside the abradable element 7. The dotted line 39a represents the position of the points located at the end of the wiper 5 located facing the abradable element 7. In this situation, the dotted line 39a follows an orthoradial direction, which means that the end of the wiper 37a has the shape of a regular circle, as represented on the wiper 5 in the perspective view. For some types of turbojet engines, the temperatures reached in operation can require to make wipers from materials offering particularly high thermal strength.

These materials can furthermore have a high mechanical flexibility to the point that the manufactured wiper does not have satisfactory mechanical strength. Particularly, the shape of the radial end of the wiper intended to be placed facing the abradable element may have irregularities and its shape may deviate from the shape of a regular circle.

This situation has been represented in FIG. 3b which represents a ring-shaped abradable element 7b, which as previously has been cut axially at a particular angle then opened and laid flat. The abradable element 7b comprises cells 20 disposed adjacent to each other along the direction $D_A$ of the axis of rotation A and a circumferential direction O. The wiper 5b rotates inside the abradable element 7b. The dotted line 39b represents the position of the points located at the outer radial end of the wiper 5b located facing the abradable element 7b. In this situation, the dotted line 39b does not exactly follow a circumferential direction and has a corrugation along the axial direction whose bulges 33 are indicated in FIG. 3b. This is because the points forming the outer radial end of the wiper do not have the same position along the axial direction. They are distributed in the axial direction along the corrugation of the dotted line 39b. This situation is designated in the remainder of the text by an axial corrugation of the outer radial end of the wiper 5b. The bulges 31 of this axial corrugation of the outer radial end are indicated in FIG. 3b.

In this situation, the shape of the outer radial end deviates from the shape of a regular circle and the tightness of the seal is degraded.

It is possible to characterize the corrugation or the deviation in the form of a regular circle by the axial extent $E_3$ of the outer radial end of the wiper, associated with the corrugation along the axial direction of the end of the wiper. This axial extent $E_3$ can be calculated as the length along the axis of rotation of the turbomachine of the corrugation, or equivalently as the projection of the line 39b on the direction DA of the axis of rotation A. A tolerancing can be associated with this axial extent so that during the manufacture of a wiper, the axial extent of the outer radial end of the wiper is less than the tolerancing.

The present invention proposes an improvement in the tightness of the seal in the situation where the shape of the outer radial end of the wiper has an axial corrugation and a non-zero axial extent associated with this corrugation.

DISCLOSURE OF THE INVENTION

One object of the invention is to improve the tightness of the seal in the situation where the shape of the radial end of the wiper has a corrugation and a non-zero axial extent associated with this corrugation.

Another aim of the invention is to obtain an improvement in the tightness of the seal regardless of the flight phase of the plane, in the situation where the shape of the radial end of the wiper has a corrugation and a non-zero axial extent associated with this corrugation.

To this end, a labyrinth seal for a turbomachine, particularly of an aircraft is proposed according to a first aspect of the invention, including a rotor element and a stator element extending around the rotor element, the rotor element being adapted to rotate relative to the stator element about an axis of rotation along an axial direction, the rotor element including an annular wiper having an outer radial end extending towards an abradable element carried by the stator element, the outer radial end of the annular wiper having a corrugation along the axial direction and a non-zero axial extent associated with the corrugation, the abradable element including a plurality of cells disposed adjacent to each other along the axial direction and a circumferential direction, the cells comprising walls which extend in a substantially radial direction, the cells being distributed according to a first cell density in a first densified annular area of the abradable element, said densified annular area being located facing the radial end of the wiper, said densified annular area having an axial extent less than or equal to the axial extent of the outer radial end of the wiper, the cells being distributed according to a reference cell density outside said first area, the first density being greater than the reference density.

Advantageously, but optionally, the labyrinth seal may have one of the following characteristics or one of the possible combinations of these characteristics:
the cells are distributed according to respectively a second cell density and a third cell density in respectively a second densified annular area and a third densified annular area of the abradable element, each of the first, second and third densified annular areas being adapted to be located facing the outer radial end of the wiper during different flight phases of the aircraft, the second density and the third density each being greater than the reference density;
at least one densified annular area has an axial extent between 40% and 100% of the axial extent of the outer radial end of the wiper;
at least part of the cells have a honeycomb shape;
at least part of the cells in a densified annular area have a disc, square, triangle or rhombus shape;

It is also proposed, according to a second aspect of the invention, a method for manufacturing a labyrinth seal for a turbomachine, particularly of an aircraft, including a rotor element and a stator element extending around the rotor element, the rotor element being adapted to rotate relative to the stator element about an axis of rotation along an axial direction, the rotor element including an annular wiper having an outer radial end extending towards an abradable element carried by the stator element, the outer radial end of the annular wiper having a corrugation along the axial direction and a non-zero axial extent associated with the corrugation, the abradable element including a plurality of cells disposed adjacent to each other along the axial direction and a circumferential direction, the cells comprising walls which extend in a substantially radial direction, the method including the following steps:
manufacturing the wiper;
manufacturing the abradable element including a first densified annular area located facing the outer radial end of the wiper, said densified annular area having a first cell density, said densified annular area having an axial extent less than or equal to the axial extent of the outer radial end of the wiper, the cells being distributed according to a reference cell density outside the first densified annular area less than the first cell density.

Advantageously, but optionally, the manufacturing method can have one of the following characteristics or one of the possible combinations of these characteristics:
the manufacture respectively of a second densified annular area and of a third densified annular area of the abradable element, the cells being distributed according to respectively a second cell density and a third cell density, each of the first, second and third densified annular areas being located facing the outer radial end of the wiper during different flight phases of the aircraft, the second density and the third density each being greater than the reference density;
the measurement of the axial extent of the outer radial end of the wiper and the determination of an axial extent of at least one densified annular area of between 40% and 100% of the measurement of the axial extent of the outer radial end of the wiper;
the determination of a cell density of at least one densified annular area by taking into account the measurement of the axial extent of the outer radial end of the wiper;
the manufacture of the abradable element includes the manufacture of cells having a honeycomb shape;
the manufacture of the abradable element includes the manufacture in a densified annular area of cells having a disc, square, triangle or rhombus shape; It is also proposed, according to a third aspect of the invention, a turbomachine comprising a labyrinth seal as described above.

DESCRIPTION OF THE FIGURES

Other characteristics, aims and advantages of the invention will emerge from the following description which is purely illustrative and not limiting, and which should be read in relation to the appended drawings in which.

DETAILED DESCRIPTION OF THE INVENTION

In all of the figures, similar elements bear identical references.

Figure 5:
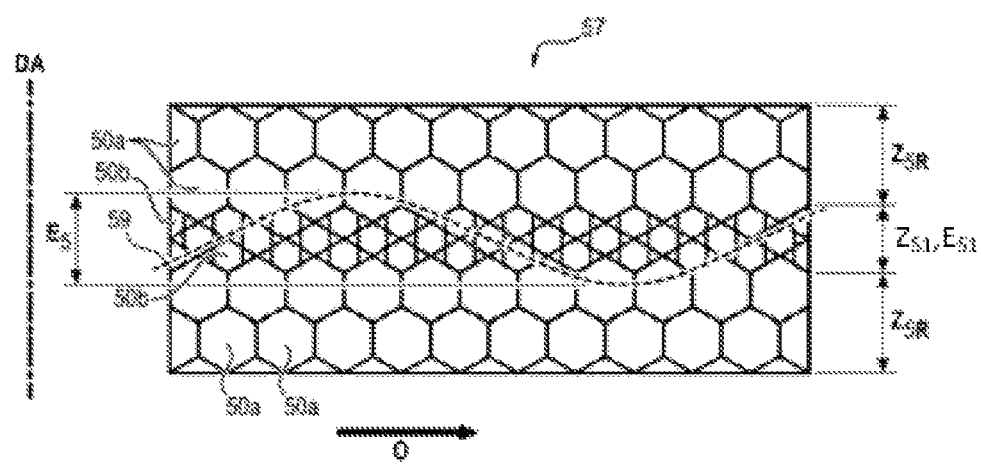
FIG. 5 represents an abradable element opened and laid flat as well as the position of the outer radial end of a facing wiper.

FIG. 5 represents an abradable element 57 opened and laid flat and the position of the end of a facing wiper symbolized by the dotted line 59. The dotted line 59 does not follow a circumferential direction and has a corrugation. The outer radial end of the wiper has deviations in the shape of a regular circle. The deviation in the form of a regular circle can be characterized by the axial extent $E_5$ of the outer radial end of the wiper which is the projection of the line 59 along the direction $D_A$.

Figure 1:
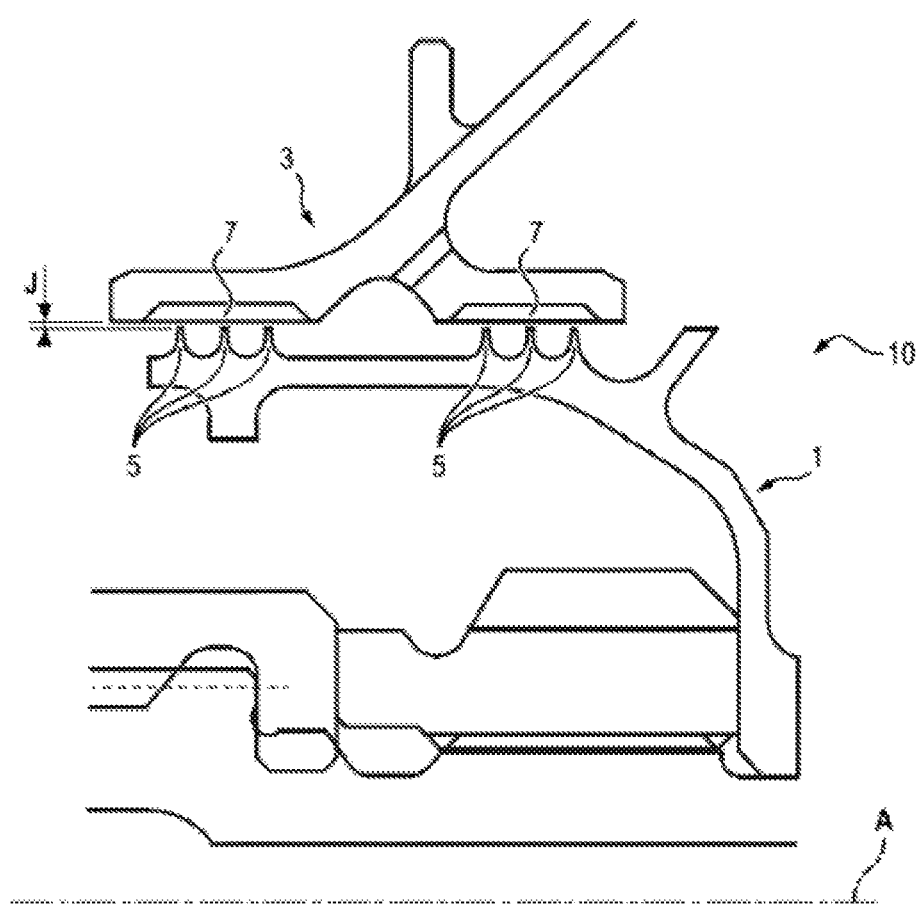
FIG. 1, already discussed, represents a labyrinth seal.
Figure 2:
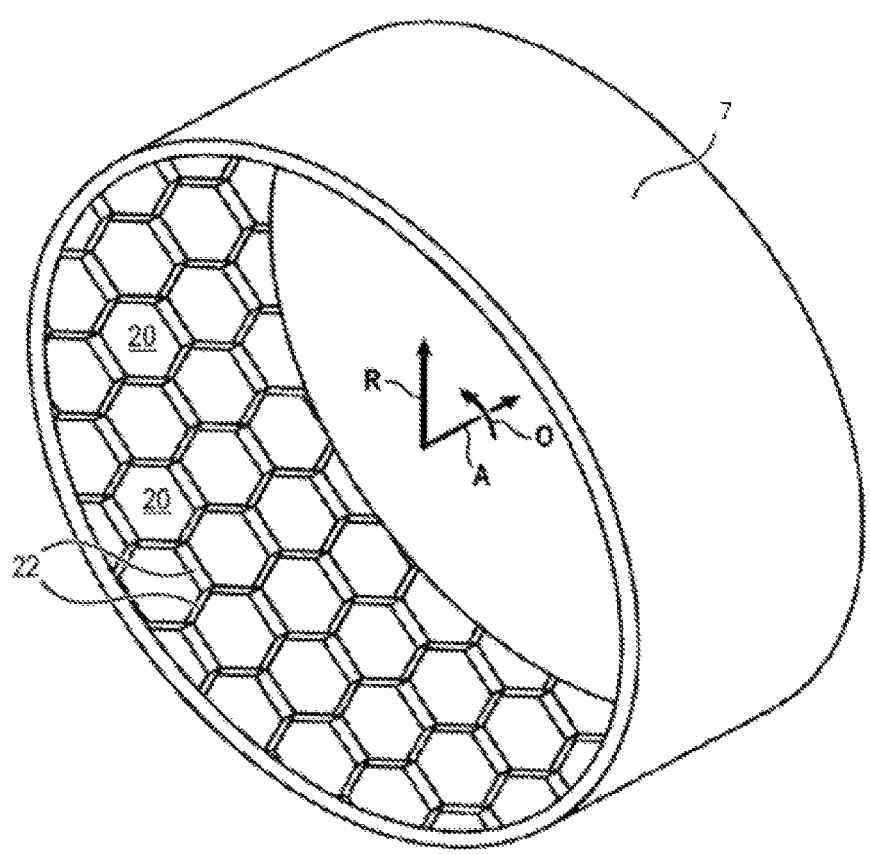
FIG. 2, already discussed, represents an abradable element.
Figure 3A:
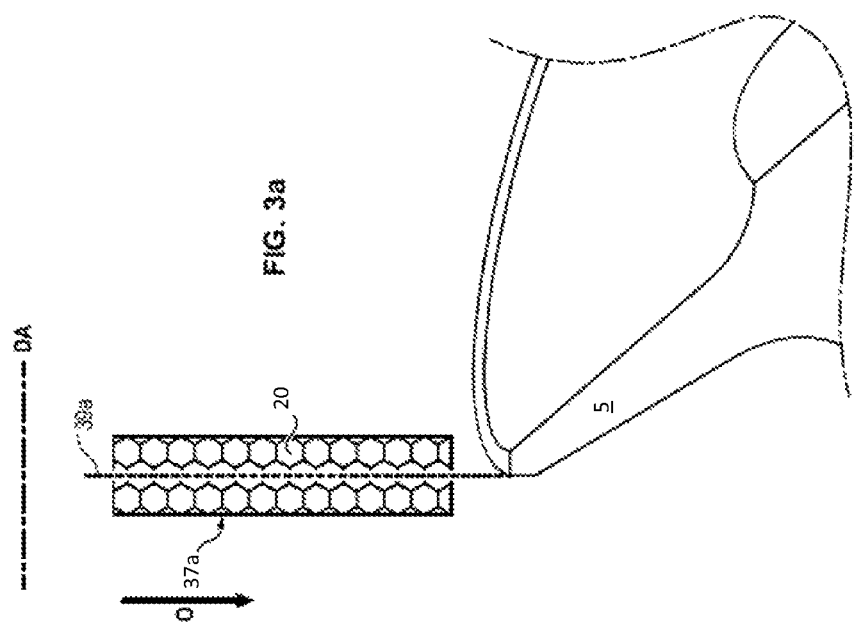
FIG. 3a, already discussed, represents an opened and laid flat abradable element as well as the outer radial end of a facing wiper.
Figure 3B:
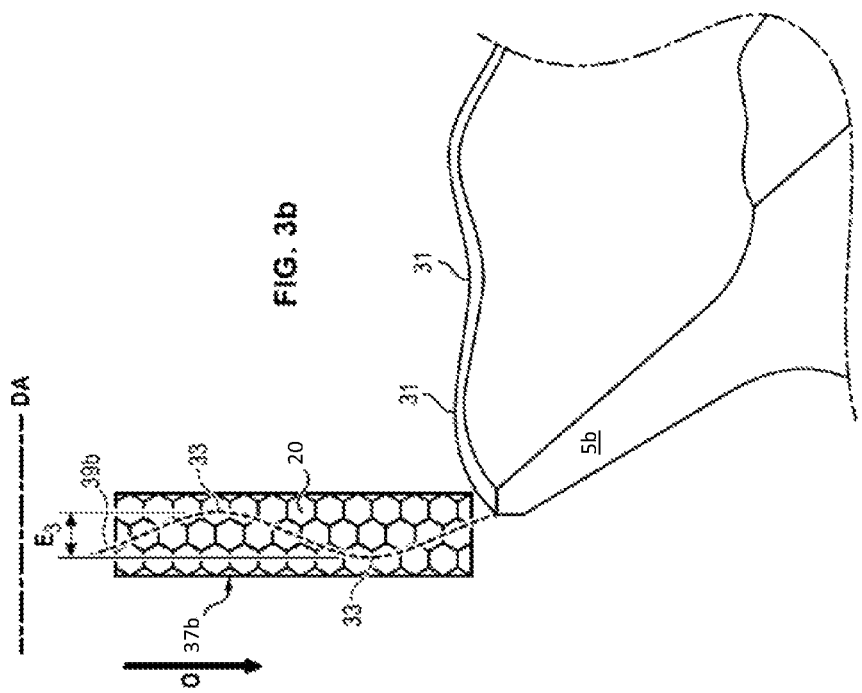
FIG. 3b, already discussed, represents an abradable element opened and laid flat as well as the outer radial end of a facing wiper.
Figure 4:
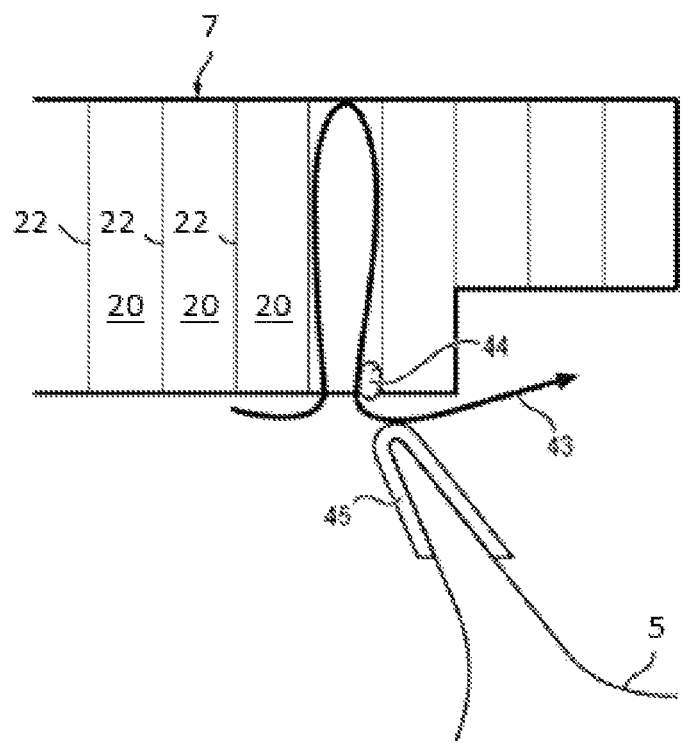
FIG. 4, already discussed, represents an axial cross section of an abradable element and of a facing wiper.

FIGS. 1, 2 and 5 propose a labyrinth seal 10 for a turbomachine, particularly of an aircraft, including a rotor element 1 and a stator element 3 extending around the rotor element 1, the rotor element 1 being adapted to rotate relative to the stator element 3 about an axis of rotation A, the rotor element including an annular wiper 5 having an outer radial end extending towards an abradable element 7, 57 carried by the stator element 3, the outer radial end of the annular wiper having a corrugation along the axial direction and a non-zero axial extent $E_5$ associated with the corrugation, the abradable element including a plurality of cells 50a, 50b disposed adjacent to each other along the direction $D_A$ of the axis of rotation A and a circumferential direction O, the cells 50a, 50b comprising walls 22 which extend in a substantially radial direction R, the cells 50a, 50b being distributed according to a first cell density in a first densified annular area $Z_{51}$ of the abradable element, said densified annular area $Z_{51}$ being located facing the radial end of the wiper, said densified annular area having an axial extent $E_{51}$ less than or equal to the axial extent of the radial end of the wiper, the cells being distributed according to a reference cell density outside said first area, the first density being greater than the reference density.

The walls 22 of the cells of the abradable element extend in a substantially radial direction means that the wall(s) 22 contributing in the definition of a cell is/are a surface which has a direction of elongation which is close to the radial direction R. A direction close to another direction means here that the angle separating the two directions is less than 2 degrees.

The first densified annular area $Z_{51}$ represented in FIG. 5 corresponds to cells 50b of the abradable element which are smaller in size than the cells 50a located outside this first densified annular area $Z_{51}$, in the areas $Z_{5R}$. It is therefore possible to place a larger number of cells per surface unit in the first densified annular area $Z_{51}$ that is to say to obtain a first density greater than the reference density.

The densified annular area $Z_{51}$ located facing the radial end of the wiper is reflected in FIG. 5 by the fact that along the axial direction A, the first densified annular area $Z_{51}$ and the dotted line 59 are centered at the same position.

For example, the difference in position between the central axis of the first densified annular area $Z_{51}$ and the central axis of the dotted line 59 can be chosen less than 0.5 mm, even a lower value.

The densified annular area $Z_{51}$ can be characterized by its axial extent $E_{51}$, that is to say the width of the area along the axial direction. This axial extent of the densified area is chosen to be less than or equal to the axial extent of the radial end of the wiper.

The technical effect associated with a higher cell density of the abradable element facing the wiper is to improve the tightness of the seal. The gas flow which attempts to flow between the abradable element 57 and the wiper from upstream to downstream of the turbomachine encounters more disturbance due to the greater number of present cells 50b.

A greater cell density of the abradable element further upstream or further downstream of the wiper does not substantially modify the tightness of the seal, so that it is not necessary for the densified annular area to present an axial extent greater than the axial extent of the radial end of the wiper.

Figure 6:
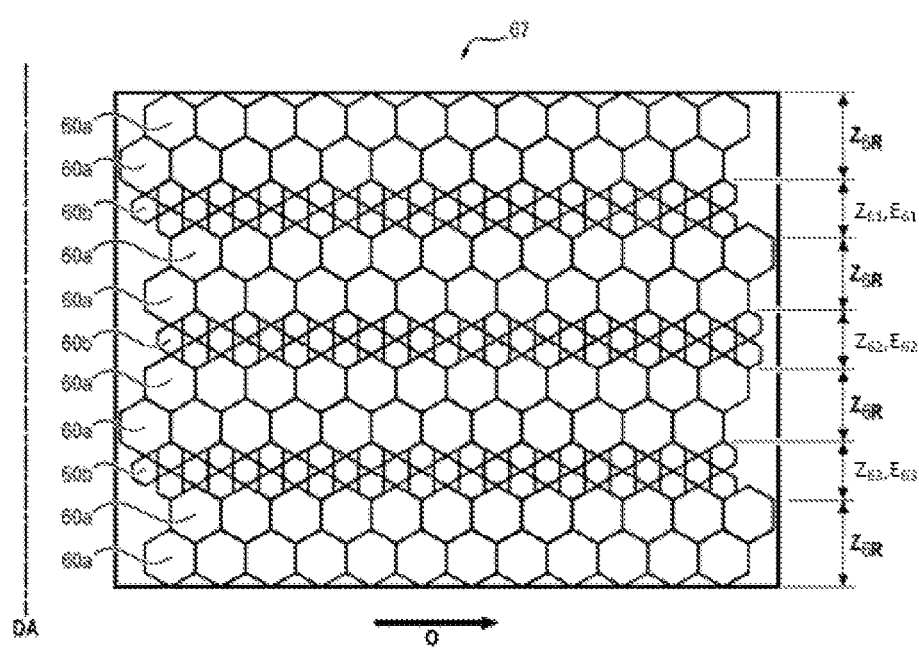
FIG. 6 represents an abradable element opened and laid flat.

FIG. 6 represents an abradable element 67 laid flat. The position of the end of a facing wiper has not been represented, but in this situation, the radial end of the wiper has an axial corrugation or deviations in the form of a regular circle.

In FIG. 6, as in the case of FIG. 5, the abradable element 67 includes a plurality of cells 60a, 60b disposed adjacent to each other along the direction $D_A$ of the axis of rotation A and a circumferential direction O, the cells 60a, 60b being distributed according to a first cell density in a first densified annular area $Z_{61}$ of the abradable element, said densified annular area $Z_{61}$ being located facing the radial end of the wiper, the cells being distributed according to a reference cell density outside said first area $Z_{61}$, the first density being greater than the reference cell density.

FIG. 6 proposes an abradable element of a labyrinth seal as presented above and in which, moreover, the cells 60a, 60b are further distributed according to respectively a second cell density and a third cell density in respectively a second densified annular area $Z_{62}$ and a third densified annular area $Z_{63}$ of the abradable element, each of the first, second and third densified annular areas $Z_{61}$, $Z_{62}$, $Z_{63}$ being adapted to be located facing the radial end of the wiping during different flight phases of the aircraft, the second density and the third density each being greater than the reference density. The first, second and third densifier annular area Z-61, Z62 and Z63 thus defined have respective axial extents E61, E62 and E63.

During the different flight phases, the turbomachine is more or less loaded so that the temperature and the expansion of the parts change within the turbomachine. Particularly, the temperature is lower in the "cold" phase, that is to say when the turbomachine is started, than in the "cruise" phase, that is to say when the turbomachine is in a mode that allows the flight. Likewise, the temperature is lower in the "cruise" phase than in the "climb" phase, that is to say when the turbomachine is in a mode that allows the take-off.

At the system formed by the abradable element and the wiper, the position of the wiper relative to the abradable element in the direction $D_A$ of the axis A of rotation changes depending on the flight phase. Three axial positions "cold", "cruise" and "climb" of the wiper relative to the abradable element can be identified for each of the flight phases "cold", "cruise" and "climb", the axial position "cruise" being between the two other axial positions "cold" and "climb".

In the situation where the abradable element has only one densified annular area, and if, while switching from a first flight phase to a second flight phase, the wiper is no longer located facing the densified annular area then the improvement in the tightness of the seal obtained during the first flight phase is lost during the second flight phase.

The technical effect associated with the presence of three densified annular areas located facing the three axial positions "cold", "cruise" and "climb", of the wiper is to maintain the improvement of the tightness of the seal during each of the three flight phases "cold", "cruise" and "climb".

The labyrinth seals proposed in this application have at least one densified annular area, whose axial extent can be more precisely defined. Particularly, it can be specified that the ratio between the axial extent of the densified annular area and the axial extent of the outer radial end is comprised between 40% and 100%.

The presence of a densified annular area located facing the outer radial end of the wiper allows improving the tightness of the seal. However, the greater number of walls within the abradable element that are present facing the wiper decreases the abradable nature or "abradability" of the abradable element. The abradable nature here corresponds to the fact that in the event of contact between the abradable element and the wiper, it is the abradable element that loses material and deteriorates on contact with the wiper and not vice versa.

Also, in order to set the extent of a densified annular area, there is a compromise between the abradability of the abradable element and the tightness of the seal. Particularly, the closer the axial extent of the densified annular area is to the axial extent of the outer radial end of the wiper, the more the tightness of the seal is improved and the less the abradable element has an abradable nature.

A ratio between the axial extent of the densified annular area and the axial extent of the outer radial end between 40% and 100% allows an interesting compromise between the abradability of the abradable element and the tightness of the seal. Particularly, a ratio between 40% and 80% allows an interesting compromise for systems where the differential expansions are important and where the need for abradability is significant.

A ratio between 80 to 100% allows an interesting compromise when it is certain that the abradable element and the wiper do not or almost come into contact with each other and that the quality of the tightness can therefore be enhanced.

Different shapes can be chosen for the cells of the abradable element.

The honeycomb shape i.e. regular hexagon shape can be chosen.

Other geometric shapes can be chosen such as a disc, a square, a triangle or a rhombus.

It should be noted that part of the cells may be of a certain shape and another part of the cells may be of another shape.

In this manner, a labyrinth seal as presented above is proposed in which at least part of the cells has a honeycomb shape.

In this manner, a seal as presented above is proposed in which at least part of the cells has a disc, square, triangle or rhombus shape.

Figure 7:
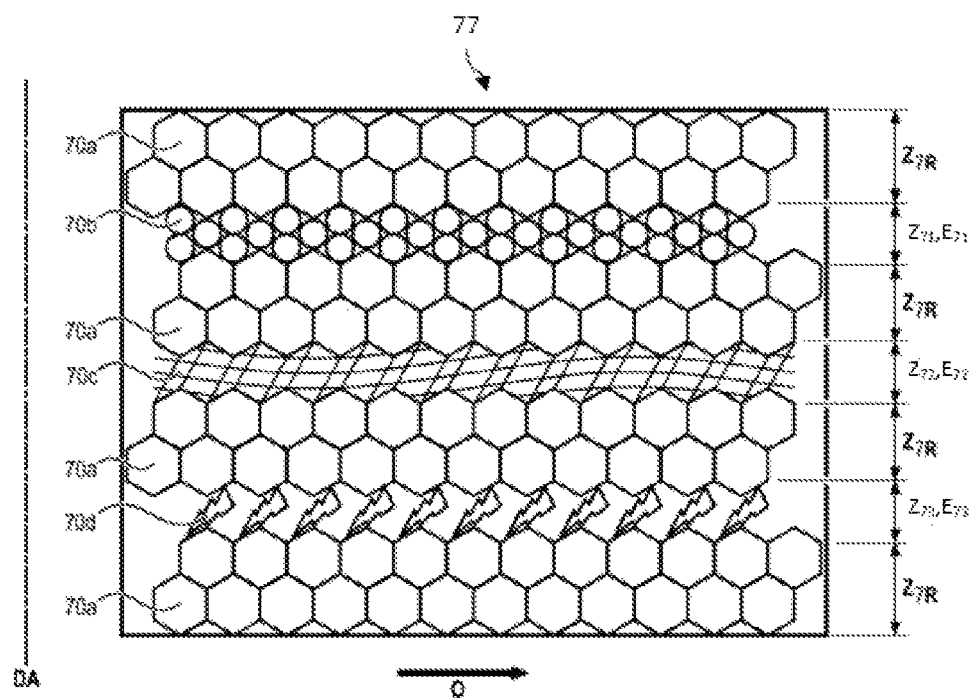
FIG. 7 represents an abradable element opened and laid flat.

FIG. 7 represents an abradable element 77 of a labyrinth seal as shown above, with areas $Z_{7R}$ where the cells of the abradable element are distributed according to the reference density. In these areas, the cells 70a have a honeycomb shape. The abradable element further includes three densified annular areas $Z_{71}, Z_{72}, Z_{73}$ of respective axial extent $E_{71}$, $E_{71}$, and $E_{73}$. Each densified annular area corresponds to a different shape of cells.

In the area $Z_{71}$ the cells 70b have a disc shape.

In the area $Z_{72}$ the cells 70c have a shape given by the intersection of a periodic array of wavy lines.

In the area $Z_{73}$ the cells 70d have a more complex and angular shape with many points where the shape has an acute cutting angle for its outline.

There is also proposed a method for manufacturing a labyrinth seal for a turbomachine, particularly of an aircraft, including a rotor element and a stator element extending around the rotor element, the rotor element being adapted to rotate relative to the stator element about an axis of rotation, the rotor element including an annular wiper having an outer radial end extending towards an abradable element carried by the stator element, the outer radial end of the annular wiper having a corrugation along the axial direction and a non-zero axial extent associated with the corrugation, the abradable element including a plurality of cells disposed adjacent to each other along the direction of the axis of rotation and a circumferential direction, the cells comprising walls which extend in a substantially radial direction, the method including the following steps:

manufacturing the wiper;

manufacturing the abradable element including a first densified annular area located facing an outer radial end of the wiper, said densified annular area having a first cell density, said densified annular area having an axial extent less than or equal to the axial extent of the outer radial end of the wiper, the cells being distributed according to a reference density outside the first annular reference area less than the first cell density.

The manufacture of the abradable element may further include the manufacture respectively of a second densified annular area and of a third densified annular area of the abradable element, the cells being distributed according to respectively a second cell density and a third cell density, each of the first, second and third densified annular areas being located facing the outer radial end of the wiper during different flight phases of the aircraft, the second density and the third density each being greater than the reference density.

The method for manufacturing a labyrinth seal as just presented may further include the following steps:

measuring the axial extent of the outer radial end of the wiper;

determining an axial extent of at least one densified annular area comprised between 40% and 100% of the measurement of the axial extent of the outer radial end of the wiper.

The method for manufacturing a labyrinth seal as just presented may further include the determination of a cell density of at least one densified annular area by taking into account the measurement of the axial extent of the outer radial end of the wiper.

The manufacturing method can be adapted to manufacture cells of different honeycomb, disc, square, triangle or rhombus shapes.

As previously mentioned, there is a compromise between the abradability of the abradable element and the tightness of the seal to set the axial extent of a densified annular area.

Similarly to the axial extent of the densified annular area, the greater the cell density, the more the tightness of the seal is improved and the less the abradable element has an abradable nature.

It is possible to use the compromise between the abradability of the abradable element and the tightness of the seal to set the density of abradable cells.

The invention claimed is:

1. A labyrinth seal for a turbomachine,
the labyrinth seal comprising:
a stator element; and
a rotor element being configured to rotate relative to the stator element about an axis of rotation along an axial direction, the rotor element comprising an annular wiper;
the stator element extending around the rotor element;
the stator element comprising an abradable element;

the annular wiper having an outer radial end extending towards the abradable element, the outer radial end of the annular wiper having a corrugation along the axial direction, the corrugation having a non-zero axial extent, the outer radial end of the annular wiper having a constant axial extent at any position of the outer radial end of the annular wiper along a circumferential direction;

the abradable element including cells disposed adjacent to each other along the axial direction and along the circumferential direction;

the cells comprising walls which extend in a substantially radial direction;

wherein the cells are distributed according to a first cell density in a first densified annular area of the abradable element;

the first densified annular area being located directly facing the outer radial end of the wiper along the axial direction;

the first densified annular area having an axial extent less than or equal to the axial extent of the corrugation;

all cells of the abradable element located outside the first densified annular area and immediately adjacent to the first densified annular area being distributed according to a reference cell density, the first cell density being superior to the reference cell density.

2. The labyrinth seal according to claim 1, wherein the cells are distributed according to respectively a second cell density and a third cell density in respectively a second densified annular area and a third densified annular area of the abradable element, each of the first, second and third densified annular areas being configured to be located directly facing the outer radial end of the wiper during different flight phases of an aircraft comprising the turbomachine, the second cell density and the third cell density each being superior to the reference cell density.

3. The labyrinth seal according to claim 1, wherein at least one of the axial extent of the first densified annular area, an axial extent of a second densified annular area and an axial extent of a third densified annular area is between 40% and 100% of the axial extent of the corrugation.

4. The labyrinth seal according to claim 1, wherein at least some of the cells have a honeycomb shape.

5. The labyrinth seal according to claim 1, wherein at least some of the cells in the first densified annular area have a disc, square, triangle or rhombus shape.

6. A turbomachine comprising a labyrinth seal according to claim 1.

7. The labyrinth seal according to claim 1, wherein the turbomachine is a turbomachine of an aircraft.

8. A method for manufacturing a labyrinth seal for a turbomachine, the labyrinth seal including a rotor element and a stator element extending around the rotor element, the rotor element being configured to rotate relative to the stator element about an axis of rotation along an axial direction, the stator element carrying an abradable element, the rotor element including an annular wiper having an outer radial end extending towards the abradable element, the outer radial end of the annular wiper having a corrugation along the axial direction, the corrugation having a non-zero axial extent, the outer radial end of the annular wiper having a constant axial extent at any position of the outer radial end of the annular wiper along a circumferential direction;

the abradable element including cells disposed adjacent to each other along the axial direction and along the circumferential direction, the cells comprising walls which extend in a substantially radial direction, the method comprising:

manufacturing the annular wiper; and manufacturing the abradable element including a first densified annular area located directly facing the outer radial end of the wiper along the axial direction, the first densified annular area having a first cell density, the first densified annular area having an axial extent less than or equal to the axial extent of the corrugation, all cells of the abradable element located outside the first densified annular area and immediately adjacent to the first densified annular area being distributed according to a reference cell density, the first cell density being superior to the reference cell density.

9. The method for manufacturing a labyrinth seal according to claim 8, wherein the manufacture of the abradable element further includes the manufacture respectively of a second densified annular area and of a third densified annular area of the abradable element, in which the cells are distributed according to respectively a second cell density and a third cell density, each of the first, second and third densified annular areas being located directly facing the outer radial end of the wiper during different flight phases of an aircraft comprising the turbomachine, the second cell density and the third cell density each being superior to the reference cell density.

10. The method for manufacturing a labyrinth seal according to claim 8, further comprising:

measuring the axial extent of the corrugation;

determining at least one of the axial extent of the first densified annular area, an axial extent of a second densified annular area and an axial extent of a third densified annular area of between 40% and 100% of the measurement of the axial extent of the corrugation.

11. The method for manufacturing a labyrinth seal according to claim 10, further comprising:

determining the first cell density by taking into account the measurement of the axial extent of the corrugation.

12. The method for manufacturing a labyrinth seal according to claim 8, wherein the manufacture of the abradable element includes the manufacture of some of the cells of the abradable element as cells having a honeycomb shape.

13. The method for manufacturing a labyrinth seal according to claim 8, wherein the manufacture of the abradable element includes the manufacture, in the first densified annular area, of some of the cells of the abradable element as cells having a disc, square, triangle or rhombus shape.

14. The method according to claim 8, wherein the turbomachine is a turbomachine of an aircraft.

15. A method for manufacturing a labyrinth seal for a turbomachine, the labyrinth seal including a rotor element and a stator element extending around the rotor element, the rotor element being configured to rotate relative to the stator element about an axis of rotation along an axial direction, the stator element carrying an abradable element, the rotor element including an annular wiper having an outer radial end extending towards the abradable element, the outer radial end of the annular wiper having a corrugation along the axial direction, the corrugation having a non-zero axial extent, the abradable element including cells disposed adjacent to each other along the axial direction and along an orthoradial direction, the cells comprising walls which extend in a substantially radial direction, the method comprising:

manufacturing the annular wiper; and manufacturing the abradable element including a first densified annular area located directly facing the outer radial end of the wiper, the first densified annular area having a first cell density, the first densified annular area having an axial extent less than or equal to the axial extent of the corrugation, the cells being distributed according to a reference cell density outside the first densified annular area, the first cell density being superior to the reference cell density, measuring the axial extent of the corrugation, determining a least one of the axial extent of the first densified annular area, an axial extent of a second densified annular area and an axial extent of a third densified annular area of between 40% and 100% of the measurement of the axial extent of the corrugation.

* * * * *